Figure 1:
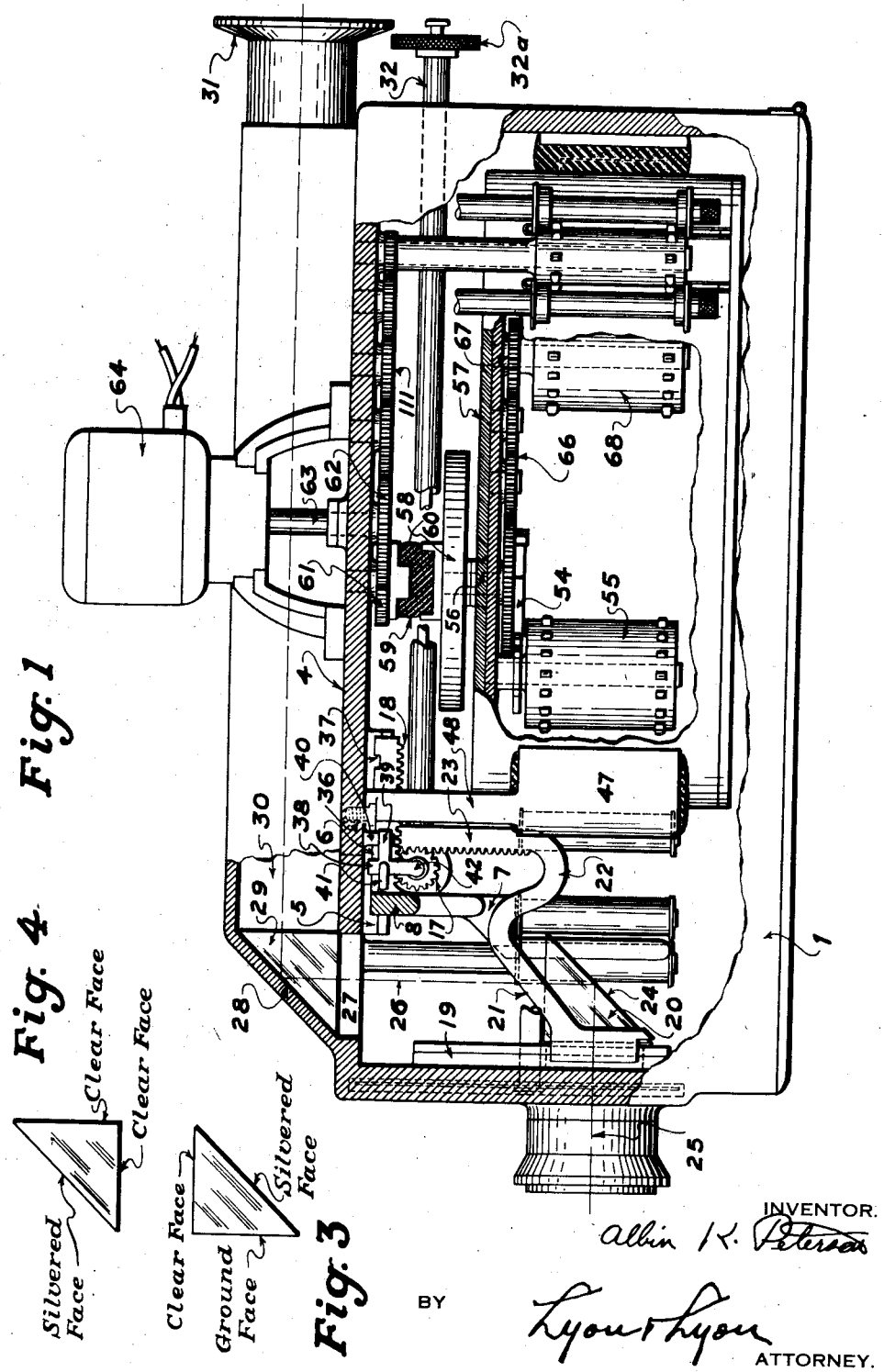

May 18, 1937.  A. K. PETERSON  2,080,782
MOTION PICTURE CAMERA
Filed May 17, 1935  2 Sheets—Sheet 2

INVENTOR.
Albin K. Peterson
BY Lyon & Lyon
ATTORNEY.

Patented May 18, 1937

2,080,782

UNITED STATES PATENT OFFICE 2,080,782

MOTION PICTURE CAMERA

Albin K. Peterson, Glendale, Calif.

Application May 17, 1935, Serial No. 21,992

9 Claims. (Cl. 88—16.2)

This invention relates to cameras, and while features of the invention may be employed in cameras operating without producing a sound record on the film, many features of the invention are particularly applicable in cameras of that type.

In the operation of motion picture cameras with sound recording means adjacent the camera, difficulty is experienced by reason of the noise developed by the operation of the feed mechanism and particularly the stop mechanism, which intermittently advances the film past the lens. Considerable undesirable noise is also produced by the fluttering to and fro of the loops formed in the runs of the film between continuous feed means and the intermittent feed device. One of the objects of this invention is to provide means for preventing such noise from affecting a sound record made at the camera, and simultaneously with the exposures which produce the motion pictures or "frames" on the film; also to prevent such noises from affecting a microphone placed near the camera when the sound record is made in a recording instrument separate from the camera.
In order to accomplish this, this intermittent feeding mechanism is preferably located directly back of the lens and on the longitudinal axis of the lens. For this reason it is not possible to focus the camera in the regular way. One of the objects of this invention is to provide means whereby the camera can be focused on the object and to enable this to be accomplished without necessitating the stopping of the feeding movement of the film.
A further object of the invention is to provide a motion picture camera with a sound recording attachment which can be operated so as to employ the light from the object being photographed to produce a sound record on the film;
also to provide a construction which will enable the camera to be used with or without the sound recording attachment, and with a magazine for carrying a film that is fed through the camera and past the axis of the lens.
It has been found in practice that a film under tension and connected with intermittent feed mechanism can transmit sound through the taut film so that the sound vibrations may pass to the magazine or other parts of the camera, and in this way produce undesired sound effects on a microphone near the camera. This, of course, is undesirable; and one of the objects of this invention is to overcome this defect and to provide means whereby the runs of the film as they pass to the sound recording device, are in a more or less slack condition.

In ordinary cameras of this type, every possible means is resorted to to reduce the noise, and prevent it from reaching microphones, but it is, of course, impossible to cover the lens and hence the lens may act as an amplifier or resonator to carry the noise from the intermittent feed mechanism and the fluttering loops. My invention overcomes this defect in a practical way, and makes it possible to build a light-weight silent camera with the microphone attached to the camera body. The invention can also be practiced in the conventional manner in the studio without necessitating the use of cumbersome insulating boxes.

Further objects of the invention will appear hereinafter.

The invention consists in the novel parts and combination of parts to be described hereinafter, all of which contribute to produce an efficient motion picture camera.

A preferred embodiment of the invention is described in the following specification, while the broad scope of the invention is pointed out in the appended claims.

In the drawings:

Figure 1 is a plan and partial section of the camera embodying my invention, taken about on the line 1—1, with certain parts broken away, and showing the inner soundproof case for the feed mechanism with its wall broken away to disclose parts of the feed mechanism within the same. This view also illustrates the film guide in a position withdrawn from the proximity to the lens and with the reflector interposed to the rear of the lens so as to enable the image formed by the lens to be reflected to one side so that it can be seen from an eye-piece at the rear of the camera.

Figure 2:
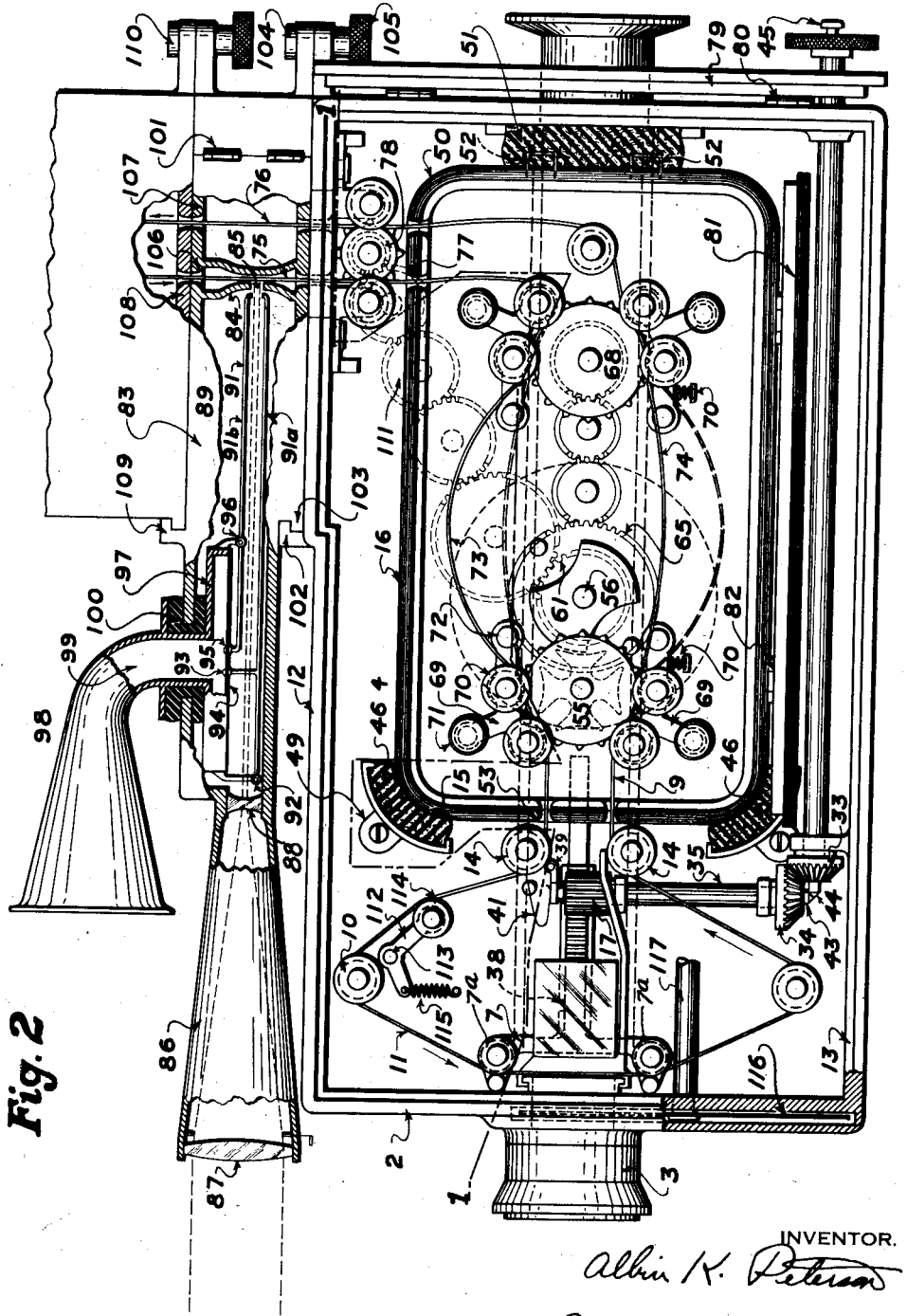

Fig. 2 is a side elevation of the camera with the side doors of the outer case and the inner case in an open position, so as to disclose a mechanism shown more or less diagrammatically on the interior of the camera. This view shows a portion of the front wall of the outer case in section, and illustrates the film guide in its normal position in proximity with the lens. This view also illustrates a sound recording attachment secured on the upper wall of the outer case, partially broken away and shown in section so as to illustrate the mounting and construction of this sound recording attachment. This view also shows a portion of the film magazine mounted on the side of the recording device remote from the main case or outer case of the camera. This view also illustrates particularly the sound deadening means for mounting the soundproof inner case.

Fig. 3 is a side elevation of the reflector, which is interposed back of the lens for focusing purposes; and Fig. 4 is a similar view of a cooperating reflector which receives the reflected image from the first-named reflector, and reflects the light back to the eye-piece.

Before proceeding to a more detailed description of the invention, it should be stated that in practicing the invention, I prefer to provide a soundproof inner case in which is carried the feed mechanism, which advances the film through the film guide back of the lens. This is to enable the camera to be used when desired, with a sound recording attachment through which the film passes by a continuous feed movement when a picture is being shot, and the sound recording device provides for producing a sound record through the agency of the light coming from an object, or, if desired, this light may be supplemented by additional light. Between the soundproof inner case and the lens, I provide for guiding the film in a loop, and construct the film guide so that it can be withdrawn from the proximity to the lens, to enable a reflector to be interposed, and this reflector operates to reflect the image laterally, and cooperates with another reflector for reflecting a beam forming the image rearwardly to an eye-piece at the back of the camera. In this way, it becomes possible to focus the lens on the object without interfering in any way with the film feeding mechanism. Hence the focusing can be accomplished even if the film is still running. The camera is provided with simple means for withdrawing the film guide from the lens and simultaneously advancing the primary or first reflector into the space to the rear of the lens and in front of the loop of film that passes through the film guide.

Referring more particularly to the parts, the camera includes a box or outer case 1, the forward wall 2 of which is provided with a lens housing 3 carrying a lens, not illustrated. On one of the side walls 4 of the outer case 1, I provide a guide 5 for a carriage 6, which supports a film guide 7, said film guide being supported on an inwardly projecting bracket 8 extending from the carriage 6. This film guide is provided with oppositely disposed guide rollers 7a, over which the film 9 passes in running through the film guide. On the wall 4 of the outer case, guide rollers 10 are mounted, and about these rollers the film is guided so as to form a loop 11 in the film at the point where it passes through the film guide. The rollers 10 are located near the upper wall 12 and bottom wall 13 of the outer case, and in addition to these rollers other guide rollers 14 are provided, as indicated in Fig. 2, for guiding the film through the forward wall 15 of a soundproof inner case 16.

I provide means for moving the carriage 6 along the guide 5 to withdraw the film guide 7 from proximity to the lens in the lens housing 3. Any suitable means may be employed for this purpose, but I prefer to employ pinion means including a pinion 17 (see Fig. 1) that meshes with a rack 18 formed on the carriage 6. On the rear side of the forward wall 2 of the outer case, I provide a guide 19 for guiding a reflector 20, which is held in a holder or bracket 21, said bracket having an offset arm 22 that terminates in an upwardly extending rack 23, and the teeth of this rack mesh with the pinion means or pinion 17, so that when this pinion is rotated to withdraw the film guide carriage, it will simultaneously move the rack 23 downwardly and thereby depress the carriage or bracket 21 that carries the reflector 20. This reflector has a silvered face 24, which is preferably inclined at an angle of 45° to the axis 25 of the lens, and when the reflector is in the position illustrated in Fig. 1, the beam of light forming the image from the object, will be reflected laterally as indicated by the dotted line 26. This beam passes through an opening 27 in the wall 4 of the camera, and falls upon an inclined reflecting face 28 on a second reflector 29, which is located at the forward end of a light tunnel 30 formed on the side of the camera, and through this light tunnel the light passes back to an eye-piece 31 near the rear wall of the camera. The pinion means, or pinion 17, can be rotated by means of a tubular shaft 32, the inner end of which is provided with a bevel gear 33 meshing with a similar bevel gear 34 on the countershaft 35, (see Fig. 2), which countershaft carries the aforesaid pinion 17. An opening in the wall 4 is provided opposite the upper end of the rack 23, and this opening 36 is indicated by dotted lines in Fig. 1.

It is preferable to provide means for locking the carriages in either of their extreme positions, that is to say, in the position in which the film guide is in its operating position immediately back of the lens housing, or in the other position illustrated in Fig. 1, in which the primary reflector 20 is interposed back of the lens. For this purpose I may provide two notches 37 and 38 in the back edge of the rack 18, to cooperate with a locking pawl 39 pivotally mounted on a small post 40, (see Fig. 1), and the free end of this locking pawl 39 is pressed down toward the rack by a bent leaf spring 41, (see Fig. 2). In order to lift this pawl out of engagement with either of the notches, it is provided with a laterally extending arm 42 against which the upper end of a long pin 43 thrusts, said pin having a conical lower end that is engaged by the conical forward end of a stem 44. This stem extends longitudinally in the tubular shaft 32 and terminates in a button 45, which can be shoved in or pulled out as desired, to control the pawl 39.

All of the walls of the inner case 16 are soundproof, that is to say, they are constructed of sound deadening material, and furthermore, this inner case is supported on sound deadening means such as sponge rubber cushions or pads 46 located toward the front and held in suitable brackets 47 that are formed on the ends of posts 48 that extend in from the wall 4. These posts are provided with laterally projecting plates forming feet 49 which are secured to the side wall 4.

At the rear wall 50 of the inner case 16 a similar sound deadening cushion or pad 51 is provided, which cooperates with the corner pads 46 to hold the inner case 16 fixed in position. For this purpose the outer side of the end wall 50 of the inner case is preferably provided with two lugs 52 that project into the interior of the pad 51.

The forward wall 15 of the inner case has small guide openings 53 through which the film 9 passes in and out, and within the inner case 16 near this forward wall 15, I provide feed mechanism preferably including an intermittent feed device 54, which may be of any desired type. In the present instance, I have illustrated a device known generally as the "Geneva" stop movement. This Geneva stop movement drives a forward guide roller 55 for the film, and this Geneva stop movement is driven by a shaft 56 mounted in the side wall 57 of the inner case that lies adjacent to the side wall 4 of the outer case. On the shaft 56 a fly wheel 58 may be provided, which is driven through a flexible sound deadening driving connection 59 including a soft pad 60, said pad being driven by the hub of a gear wheel 61. This gear wheel is driven by a driving gear 62 carried on the shaft 63, which may be driven at will by closing a circuit through a small electric motor 64 supported on the side of the outer case. On the inner end of the shaft 56 a large gear wheel 65 is provided, which drives a gear train 66 for driving a gear wheel 67 on a rear guide roller 68 that is driven at uniform speed. Roller 68 is located opposite to the inner guide roller 55. The runs of the film 9 pass over the upper and lower sides of the guide rollers 55 and 68, and are held on the same by light pressure exerted by presser devices 69 having rollers 70 that run on the outer sides of the film. The lower presser devices 69 are provided with springs 70' for pressing them upwardly, and each presser device is provided with a handle 71 that projects out toward the accessible side of the inner case 16 so as to enable the presser devices to be rotated on their pivots 72 to lift them away from the film when threading the same through the camera. In this way the runs of the film will form two fluttering loops 73 and 74 between the guide rollers 55 and 68. At the rear a film is guided in two runs 75 and 76 that pass laterally through a guide opening 77 in the upper wall of the inner case 16, and in the space between the opening 77 and the cover wall 12 of the outer case, I provide a continuously driven film feed roller 78 which drives the runs of the film through the opening 77 advancing the run 75 downwardly at a uniform speed and pulling the run 76 upwardly at a uniform speed to return it to the film magazine.

The runs 75 and 76 between the roller 68 and the driven roller 78 are slack, so that no sound will be transmitted through them into the sound recording device, which will be presently described.

The outer case 1 is made accessible by providing a door 79 connected to the same by hinges 80. This door constitutes the entire side wall of the outer case. This door is represented in its open position in Fig. 2. A similar door 81 is provided for the exposed side of the inner case 16, and this wall is secured by hinges 82, which enable it to be swung down to an open position as indicated in Fig. 2.

The runs 75 and 76 of the film pass through a sound recording device 83, and this sound recording device is preferably constructed so that the light from the object being photographed, is utilized to form a sound record on the film. In order to accomplish this, the runs 75 and 76 of the film extend in a plane substantially at right angles to the longitudinal axis of the camera. The run 75, which is forward of the run 76, passes through a film guide 84 at an opening 85. At the front of the sound recording device a lens housing 86 is provided carrying lenses 87 and 88, the former of which condenses the beam of light from the object, and the latter of which refracts the rays to form a beam 89 in which the rays extend substantially parallel with each other and through the opening 85. This beam 89 passes through the opening 90 of a light gate or valve 91, preferably comprising two oppositely disposed gate members 91a and 91b, the former of which is pivotally supported at 92 and connected at 93 to a diaphragm 94. The other gate member 91b is supported at 95 on the diaphragm and is also pivotally supported on a fixed pivot 96 from the side wall of the sound-box 97. Sound from the object is guided into the sound-box by means of a receiver horn or trumpet 98 that projects in the direction of the object and provided with an elbow 99 that directs the sound down onto the diaphragm. With this arrangement it will be evident that the vibrations of the diaphragm will cause the light gate opening 90 to enlarge or diminish in area in accordance with the sound waves projected onto the diaphragm, thereby producing a light record of the sounds which can be developed in the usual way.

In order to insulate the horn 98 and reduce its absorption of sound waves not desired to be recorded, I prefer to mount the elbow 99 in an insulating bushing 100 of soft rubber or similar material.

In order to give accessibility to the interior of the sound recording device, its side wall may be provided with hinges 101.

The sound recording device 83 is preferably removably mounted on the upper wall of the outer case 1 by suitable securing means. For this purpose I prefer to provide the wall 12 of the outer case with one or more hook-shaped brackets 102, which are engaged by a corresponding projecting tongue 103 formed on the case of the sound recording device, and at the rear end bolts 104 are provided with detachable thumb heads 105.

The runs 75 and 76 of the film pass through the guide openings 106 in the outer wall 107 of the sound recording device, and these openings align with similar openings in the adjacent wall of the film magazine 108. This magazine is removably secured on the outer wall of the sound recording device 83, which is remote from the wall 12 of the outer case, by securing means which is interchangeable with the securing means employed for securing the sound recording device to the wall 12. This enables the camera to be operated without the sound recording device whenever desired, by securing the film magazine 108 directly to the wall 12 of the camera. In other words, I provide the wall 107 with a hook-shaped bracket or brackets 109 similar to the brackets 102 by providing a removable bolt 110 in alignment with the adjacent bolt 104 and mounted in the same way.

The feed roller 78 is, of course, continuously driven, and this may be accomplished by providing a gear train 111 driven off the gear wheel 62. This gearing should be proportioned so that the peripheral speed of the roller 78 is the same in feet per second as the average speed at which the film is advanced by the stop movement device 54.

Referring again to the loop 11, and particularly to Fig. 2, I provide a tension device 112 for maintaining the loop in tension when the film guide 7 has gone away from the lens housing 3. This tension device includes a pivoted arm pivoted at 113 and carrying a roller 114, which is pulled against the same yieldingly by means of a coil spring 115.

In the operation of the camera, when it is necessary to focus it on an object, this is accomplished by rotating the shaft 32 by means of the thumb head 32a, which is rigid on it. This will rotate the countershaft 35 and the pinion 17. This will operate upon the rack 18 to move the bracket 8 away from the lens housing 3, thereby carrying the film guide 7 away so as to provide a space into which the reflector 20 can be moved; as the film guide 7 withdraws, the reflector carrier 21 will be moved down by the pinion 17 and the rack 23, so as to interpose it in position immediately back of the object lens of the camera in the lens housing 25. This will reflect light coming from the object laterally, as indicated by the line 26, so that it is projected upon the inclined face 28 of the secondary reflector 29. This will reflect the light from the image rearwardly to the eye-piece 31. It will be noted that these movements will not interfere with the guiding of the film, and for this reason the camera can be focused while the film is in motion. This is most advantageous because if it were not possible to do this, the film might be torn by accidentally closing the circuit to the motor 64 while the camera is being focused.

The noises made by the stop movement 54 and by the fluttering or whipping to and fro of the loops 73 and 74, are absorbed by the soundproof walls of the inner case 16. Sounds emanating from this inner case are absorbed further by reason of the cushions 46 and 51, which form yielding and floating supports for the inner case.

Furthermore, in accordance with my invention, the runs of the film between the guide roller 78 and the roller 68 are in a slack condition, so that no sounds will be transmitted through them as might otherwise occur if they were in a taut condition.

The sound coming from the object is received through the trumpet 98, and is controlled through the agency of the diaphragm 94, and the gate-arms 91a and 91b so as to vary the width of the beam of light that is projected on the run 75 of the film.

While the film is stationary in the film guide 7, exposure is made from the object through a rotary shutter 116 of any suitable form, carried on a shaft 117 which is continuously driven by means, not illustrated.

It is understood that the embodiment of the invention described herein, is only one of the many embodiments this invention may take, and I do not wish to be limited in the practice of the invention, nor in the claims, to the particular embodiment set forth.

I claim:

1. In a silent camera for use with sound recording mechanism, the combination of an outer case, a lens at the forward wall of the outer case, a substantially soundproof inner case within the outer case, a film guide at the rear of the lens, and feeding mechanism within the soundproof inner case for feeding the film through the forward wall of the inner case and past the film guide.

2. In a silent camera for use with sound recording mechanism, the combination of an outer case, a lens at the forward wall of the case, a film guide at the rear of the lens, a substantially soundproof inner case within the outer case for carrying film, feeding mechanism within the inner case for feeding the film through the forward wall of the inner case, and past the film guide, a sound recording device mounted outside of the outer casing, and means for guiding the film to and fro through the said sound recording device from the interior of the soundproof inner casing and in a plane substantially at right angles to the axis of the lens.

3. In a silent camera for use with sound recording mechanism, the combination of an outer case, a lens at the forward wall of the case, a film guide at the rear of the lens, a substantially soundproof inner case within the outer case for carrying film, feeding mechanism within the inner case for feeding the film through the forward wall of the inner case, and past the film guide, a sound recording device, means for removably mounting the same on the side of the outer case, a magazine for carrying a film supply with means for removably mounting the same on the side of the sound recording device remote from the outer case, and means for guiding the film to and fro from the magazine through the said sound recording device and into the interior of the soundproof inner case.

4. In a silent camera for use with sound recording mechanism, the combination of an outer case, a lens at the forward wall of the case, a film guide at the rear of the lens, a substantially soundproof inner case within the outer case for carrying film, feeding mechanism within the inner case for feeding the film through the forward wall of the inner case, and past the film guide, a sound recording device, means for removably mounting the same on the side of the outer case, a magazine for carrying a film supply with means for removably mounting the same on the side of the sound recording device remote from the outer case, means for guiding the film to and fro from the magazine through the said sound recording device and into the interior of the soundproof inner case, and means for maintaining the runs of the film passing through the sound recording device in a slack condition between the recording device and the soundproof inner case.

5. In a silent camera for use with sound recording mechanism, the combination of an outer case, a lens at the forward wall of the case, a film guide to the rear of the lens, a substantially soundproof inner case within the outer case for carrying film having openings through which the film passes, feeding mechanism within the inner case for feeding the film through the forward wall of the inner case, and past the film guide, and means including a substantially soundproof driving connection for driving the feeding mechanism from the exterior of the outer case.

6. In a silent camera for use with sound recording mechanism, the combination of an outer case, a lens at the forward wall of the case, a film guide to the rear of the lens, a substantially soundproof inner case within the outer case for carrying film, feeding mechanism within the inner case for feeding the film through the forward wall of the soundproof inner case, and past the film guide, a sound recording device, securing means for removably securing the same on the wall of the outer case, a film magazine, securing means for securing the same on the side of the sound recording device remote from the outer case, means for guiding the film from the magazine to and fro through the sound recording device and into and out of the inner case, said securing means being interchangeable so that the sound recording device can be removed and the film magazine secured directly to the wall of the outer case.

7. In a silent camera, the combination of an outer case, a lens in the front wall of said case, an inner case mounted within the outer case and having soundproof walls, film feeding mechanism mounted in the inner case, means for guiding film through the wall of the inner case and past the lens, and sound deadening pads for supporting the inner case within the outer case.

8. In apparatus of the kind described, the combination of an outer case, an inner case mounted in the outer case and having sound deadening walls, feeding mechanism for the film mounted within the inner case, a sound recording device on the exterior of the outer case, means for guiding the film through the sound recording device and through a wall of the inner case so that it may pass in two runs moving in and out of the inner case, and continuously driven means for advancing the runs of the film located between the inner case and the sound recording device operating to maintain slack in the runs of the film as it passes to or from the inner case.

9. In a camera, the combination of an outer case, a lens at the forward wall of the case, a film guide to the rear of the lens, means for moving the film guide away from the lens, a reflector, means for interposing the same into the space between the lens and the film guide, said reflector having an inclined reflector face for reflecting the light beam received through the lens, in a transverse direction with respect to the axis of the lens, a second reflector for reflecting the light beam from the first reflector in a general rearward direction, a substantially soundproof inner case within the outer case for carrying the film having guide openings in its wall for the film, and feeding mechanism within the inner case for feeding the film through the said guide openings, and past the film guide and including an intermittent feed device forming fluttering loops in the film within the inner case.

ALBIN K. PETERSON.